United States Patent [19]
Gilbert

[11] Patent Number: 6,070,483
[45] Date of Patent: *Jun. 6, 2000

[54] LASH ADJUSTMENT ASSEMBLY

[75] Inventor: Wendell L. Gilbert, Pleasant Shade, Tenn.

[73] Assignee: TRW Inc., Lyndhurst, Ohio

[ * ] Notice: This patent is subject to a terminal disclaimer.

[21] Appl. No.: 08/905,172

[22] Filed: Aug. 1, 1997

[51] Int. Cl.[7] .............................. F16H 55/28; B62D 5/22
[52] U.S. Cl. ................... 74/409; 74/402; 74/422; 74/498
[58] Field of Search ................ 74/498, 409, 398, 74/422, 402; 188/71.9, 196 F

[56] References Cited

U.S. PATENT DOCUMENTS

| | | | |
|---|---|---|---|
| 3,252,348 | 5/1966 | Folkerts | 74/498 |
| 3,665,783 | 5/1972 | Arnold | 74/498 |
| 3,884,091 | 5/1975 | Hay | 74/440 |
| 3,944,027 | 3/1976 | Yamamoto | 188/71.9 |
| 4,323,143 | 4/1982 | Negishi | 188/71.9 |
| 5,211,069 | 5/1993 | Wada et al. | 74/498 |
| 5,341,701 | 8/1994 | Krom et al. | 74/398 |

FOREIGN PATENT DOCUMENTS

| | | | |
|---|---|---|---|
| 26 06 365 | 8/1977 | Germany. | |
| 62-255276 | 11/1987 | Japan. | |
| 2014691 | 8/1979 | United Kingdom | 74/422 |
| WO9107304 | 5/1991 | WIPO. | |

*Primary Examiner*—David A. Bucci
*Assistant Examiner*—William C Joyce
*Attorney, Agent, or Firm*—Tarolli, Sundheim, Covell, Tummino & Szabo L.L.P.

[57] ABSTRACT

An apparatus (10) for use in turning steerable wheels of a vehicle having an engine includes a first gear (16) which is rotatable about a first axis (24) and a second gear (14) having teeth (20) in meshing engagement with teeth (18) on the first gear (16). The first gear (16) is movable along the first axis (24) to reduce clearance between the teeth (18) and (20) of the first and second gears (16) and (14). Adjustment of the first gear (16) along the first axis (24) is prevented during operation of the engine of the vehicle. Adjustment of the first gear (16) along the first axis (24) is enabled when the engine of the vehicle is in a non-operational condition.

77 Claims, 3 Drawing Sheets

LASH ADJUSTMENT ASSEMBLY

BACKGROUND OF THE INVENTION

The present invention relates to a lash adjustment assembly which is effective to reduce clearance between teeth of gears in a vehicle steering apparatus.

A known lash adjustment assembly is disclosed in U.S. Pat. No. 3,884,091. U.S. Pat. No. 3,884,091 discloses an adjustment assembly for moving a first gear along a first axis to reduce clearance between teeth of the first gear and a second gear. A shaft extension of the first gear rotatably supports a pair of cams. The cams are fixed together to provide cam slots. The cam slots are engaged by cam elements of a support cam non-rotatably fixed to a housing. The cams are rotatably biased in an up ramp direction relative to the support cam by a spring to effect axial adjustment of the first gear. A cam locking device is connected to the cams to permit axial adjustment only when the steering gear is centered and to prevent axial adjustment during turning of the steering gear in either direction from the centered position.

SUMMARY OF THE INVENTION

The present invention provides a new and improved apparatus for use in turning steerable wheels of a vehicle having an engine. The apparatus includes a first gear which is rotatable about a first axis and a second gear having teeth in meshing engagement with teeth on the first gear. An adjustment assembly is provided to move the first gear along the first axis to reduce clearance between teeth of the first and second gears. Adjustment of the first gear along the first axis is prevented during operation of the engine of the vehicle. Adjustment of the first gear along the first axis is enabled when the engine of the vehicle is in a non-operational condition.

A first thread convolution is rotatable with the first gear. A member has a second thread convolution engaging the first thread convolution. The member is rotatable relative to the first thread convolution to transmit force to the first gear. Spring means causes relative rotation between the member and the first thread convolution to move the first gear along the first axis.

BRIEF DESCRIPTION OF THE DRAWINGS

The foregoing and other features of the present invention will become more apparent to one skilled in the art to which the present invention relates upon consideration of the following description of the invention with reference to the accompanying drawings, wherein:

FIG. 4 is a schematic illustration of a vehicle.

DESCRIPTION OF A SPECIFIC PREFERRED EMBODIMENT OF THE INVENTION

Figure 1:
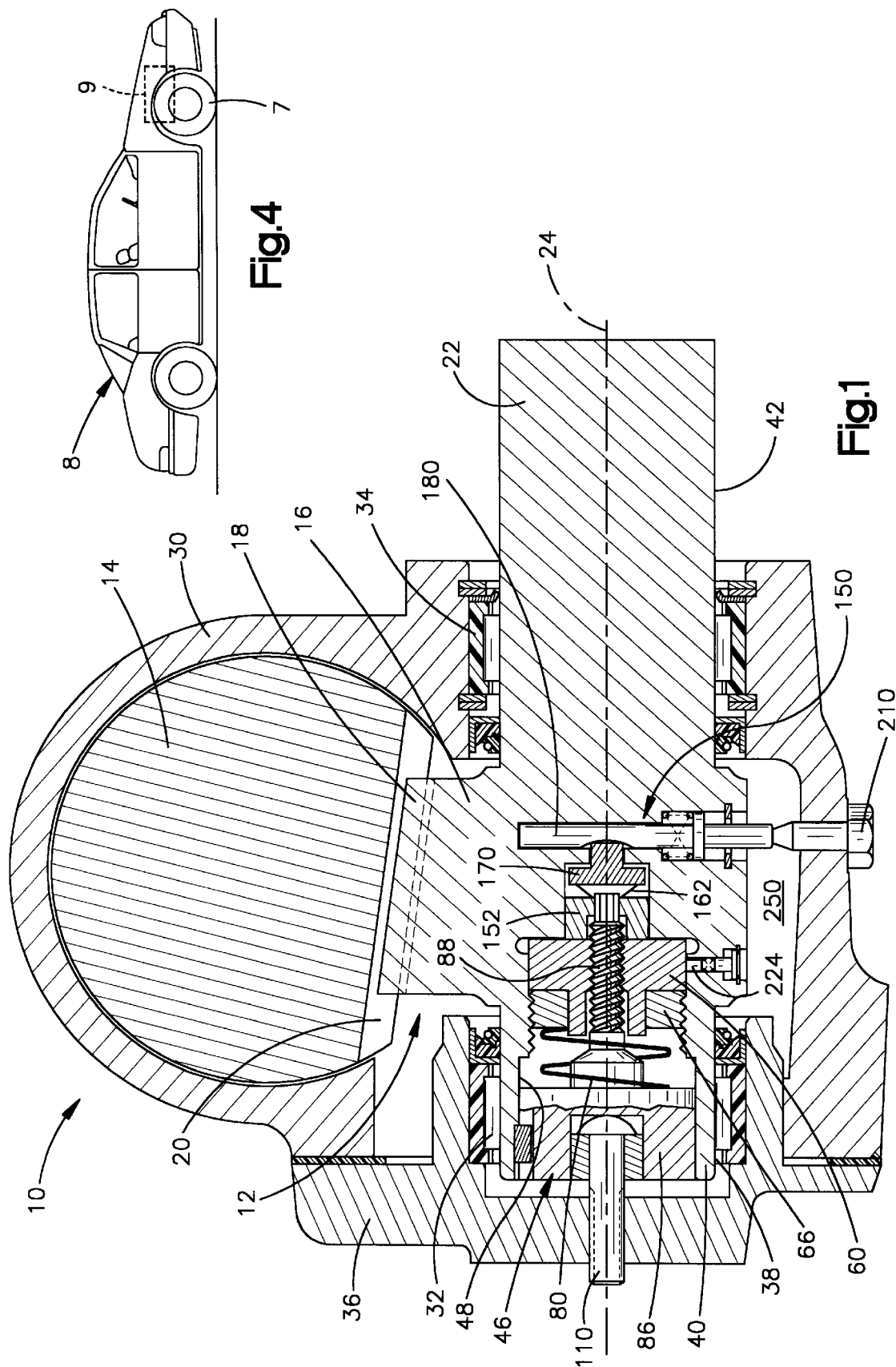
FIG. 1 is a fragmentary sectional view of an apparatus constructed in accordance with the present invention for use in turning steerable wheels of a vehicle.

An apparatus 10 (FIG. 1) for use in turning steerable wheels 7 (FIG. 4) of a vehicle 8 having an engine 9 includes a gear set 12 (FIG. 1) which is actuatable by a power steering motor (not shown). A pump (not shown) provides pressurized fluid to the power steering motor. The gear set 12 includes a rack gear 14 connected with a piston of the power steering motor. The gear set 12 also includes a sector gear 16 which has teeth 18 disposed in engagement with teeth 20 on the rack gear 14. The sector gear 16 has an output shaft 22 which is connected with a pitman arm (not shown) of a steering linkage. The sector gear 16 is rotatable about a central axis 24.

The rack and sector gears 14 and 16 are enclosed by a housing 30. The sector gear 16 is supported for rotation about the axis 24 by an inner bearing assembly 32 and an outer bearing assembly 34. The inner bearing assembly 32 is mounted on an end wall 36 of the housing 30. The inner bearing assembly 32 engages a cylindrical outer side surface 38 on an end portion 40 of the sector gear 16. The outer bearing assembly 34 engages a cylindrical outer side surface 42 on the output shaft 22.

The general construction of the rack gear 14 and the sector gear 16 and the manner in which they cooperate with a power steering motor is the same as is disclosed in U.S. Pat. Nos. 3,741,074 and 4,164,892. However, the rack and sector gears 14 and 16 could have a different construction and could be associated with a different type of power steering motor if desired.

In accordance with a feature of the invention, a lash adjustment assembly 46 (FIG. 1) is provided in a bore 48 in the sector gear 16 to compensate for gear tooth wear. The lash adjustment assembly 46 compensates for gear tooth wear by reducing clearance between the teeth 18 and 20 on the sector gear 16 and rack gear 14.

The lash adjustment assembly 46 is effective to reduce the clearance between the teeth 18 and 20 on the sector gear 16 and rack gear 14 when the engine of the vehicle is in a non-operational condition and the steering apparatus 10 is in an on-center or initial condition. When the engine of the vehicle is in the non-operational condition, the pump does not supply pressurized fluid to the power steering motor. When the steering apparatus 10 is in an on-center condition, the steerable vehicle wheels (not shown) are in a straight-ahead orientation. When the engine is in the non-operational condition and the steerable vehicle wheels are in a straight-ahead orientation, there is minimal loading between the sector gear teeth 18 and the rack gear teeth 20 and minimal possibility of increasing the loading between the teeth.

When the apparatus 10 is in an on-center or initial condition, the vehicle steering wheel (not shown) can be rotated to effect turning movement of the vehicle wheels. As the vehicle wheels are turned, the lash adjustment assembly is not effective to reduce the clearance between the sector gear teeth 18 and the rack gear teeth 20. However, as soon as the steering apparatus 10 is operated back to the initial or on-center condition and the engine is in the non-operational condition, the lash adjustment assembly 46 is effective to move the sector gear 16 along its axis 24 to reduce excessive clearance between the sector gear teeth 18 and the rack gear teeth 20.

The lash adjustment assembly 46 includes a force transmitting member 60 (FIG. 2) which transmits force between the end wall 36 of the housing 30 and the sector gear 16 to move the sector gear along the axis 24. The force transmitting member 60 has an axial end surface 62 in engagement with a shoulder 64 of the sector gear 16. The force transmitting member 60 engages the shoulder 64 of the sector gear 16 to move the sector gear along the axis 24.

An externally threaded nut 66 maintains the force transmitting member 60 in engagement with the shoulder 64 of the sector gear 16. The nut 66 threadably engages threads 68 of the sector gear 16 and rotates with the sector gear. The nut 66 has an axial end surface 70 engaging a surface 72 on the force transmitting member 60 axially opposite from the surface 62. The nut 66 has a central opening 74 through which an axial extension 76 of the force transmitting member 60 extends. The extension 76 supports the nut 62 for rotation with the sector gear 16.

A spring 80 applies a force to the force transmitting member 60 to urge the force transmitting member to rotate about the axis 24 relative to the sector gear 16. The spring 80 has a first end portion 82 which is fixedly connected to the axial extension 76 of the force transmitting member 60. A second end portion 84 of the spring 80 is fixedly connected to a carrier member 86. The carrier member 86 has a portion 88 with an external thread convolution 90 which threadably engages an internal thread convolution 92 of the force transmitting member 60. The spring 80 urges the force transmitting member 60 to rotate about the portion 88 in a direction which causes the force transmitting member 60 to axially move relative to the carrier member 86 toward the shoulder 64 on the sector gear 16.

A key 96 prevents the carrier member 86 from rotating relative to the sector gear 16 while permitting the sector gear to move axially relative to the carrier member. The key 96 is located within a notch 98 in the carrier member 86. The key 96 extends from the notch 98 into a slot 100 in the end portion 40 of the sector gear 16. The key 96 and slot 100 permit the sector gear 16 to axially move to the right, as viewed in FIG. 2, relative to the carrier member 86 and the housing 30.

A screw 110 threadably engages the end wall 36 of the housing 30 to permit manual adjustment of the sector gear 16 along the axis 24. A head 114 of the screw 110 is retained in a recess 116 in the carrier member 86 by a retainer 118. An axial end surface 120 of the retainer 118 engages a surface 122 on the head 114 of the screw 110. The head 114 of the screw 110 is retained between the retainer 118 and an axial end surface 124 defining the recess 116. A non-threaded portion 126 of the screw 110 extends through an opening 128 in the retainer 118. The screw 110 may be manually rotated relative to the retainer 118 and the carrier member 86 to adjust the axial position of the sector gear 16, the force transmitting member 60, and the carrier member 86 along the axis 24.

A groove 134 is formed in a side wall 136 of the sector gear 16 to enable the force transmitting member 60 to rotate relative to the sector gear 16. The groove 134 is defined by the shoulder 64 and the surface 136. The groove 134 extends around the force transmitting member 60 at a location adjacent the end surface 62.

An assembly 150 prevents rotation of the force transmitting member 60 relative to the portion 88 and the thread convolution 90 of the carrier member 86 when the sector gear 16 is not in an on-center position. Upon rotation of the sector gear 16 about the axis 24 from the on-center or initial position shown in FIG. 2, the assembly 150 prevents rotation of the force transmitting member 60 relative to the sector gear 16 and the carrier member 86. Accordingly, adjustment of the sector gear 16 along the axis 24 by the force transmitting member 60 can only occur when the sector gear is in the position shown in FIG. 2.

The assembly 150 includes a locking member 152 which engages the force transmitting member 60 to prevent rotation of the force transmitting member relative to the threaded portion 88 of the carrier member 86. An axial end face 154 of the locking member 152 includes radially extending splines or ratchet teeth which engage radially extending splines or ratchet teeth on a radially inner portion of the end face 62 of the force transmitting member 60. The locking member 152 includes a polygonal-shaped opening 156 through which a correspondingly shaped end portion 158 of the carrier member 86 extends. Flat surfaces of the opening 156 engage flat surfaces of the end portion 158 to prevent relative rotation between the locking member 152 and the carrier member 86 while permitting axial movement of the locking member relative to the carrier member.

Figure 2:
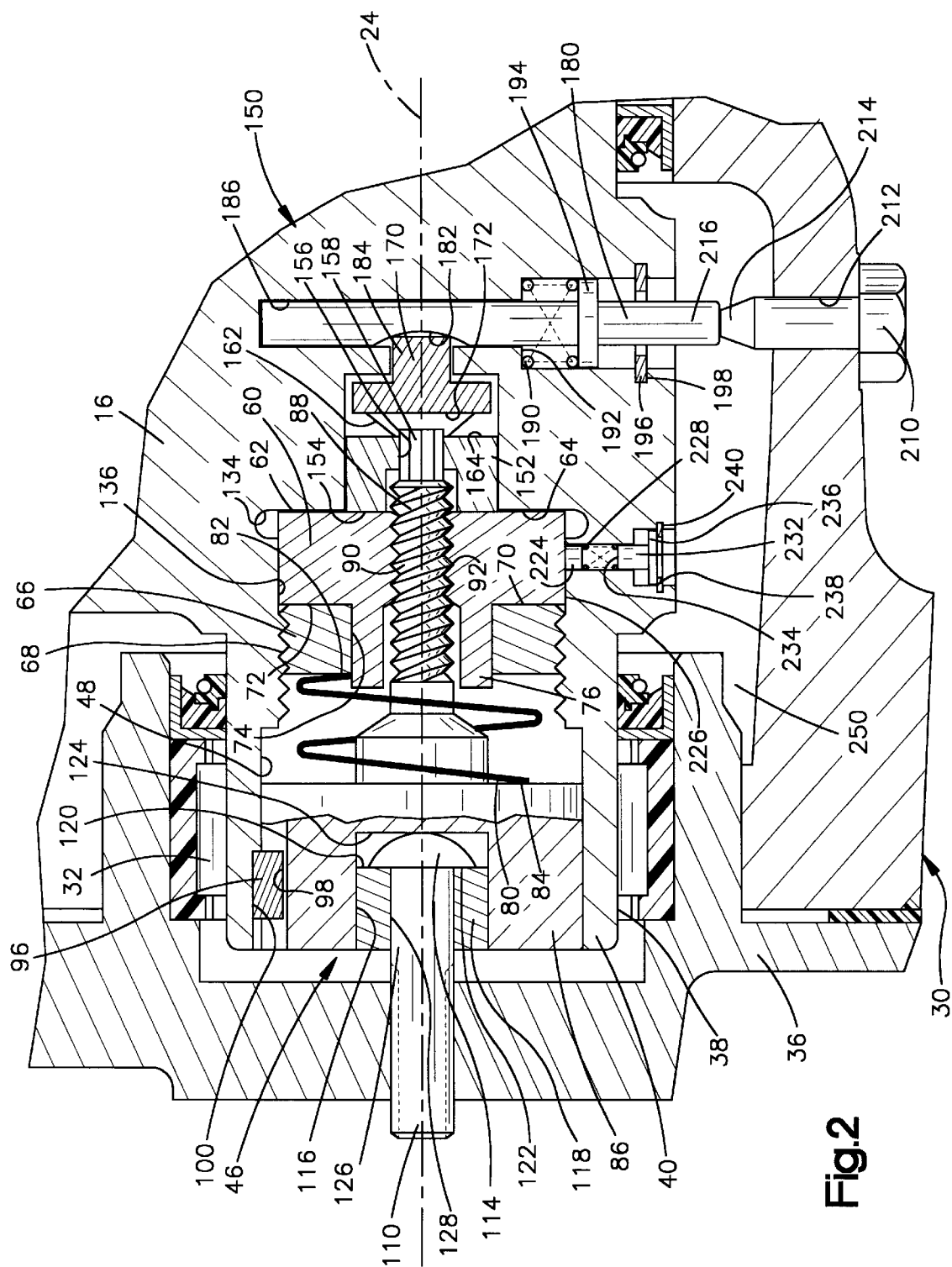
FIG. 2 is an enlarged fragmentary view of a lash adjustment assembly which forms a portion of the apparatus of FIG. 1.

A spring 162, such as a Belleville washer, urges the locking member 152 into engagement with the force transmitting member 60. The spring 162 engages an axial end surface 164 of the locking member 152 opposite from the surface 154. An axially movable member 170 has an axial end face 172 in engagement with the spring 162. The member 170 has a first position, as shown in FIG. 2, in which the spring force of the spring 162 urging the locking member 152 into engagement with the force transmitting member 60 is at a minimum. The member 170 has a second position, as shown in FIG. 3, in which the spring force of the spring 162 urging the locking member 152 toward the force transmitting member 60 is at a maximum.

Figure 3:
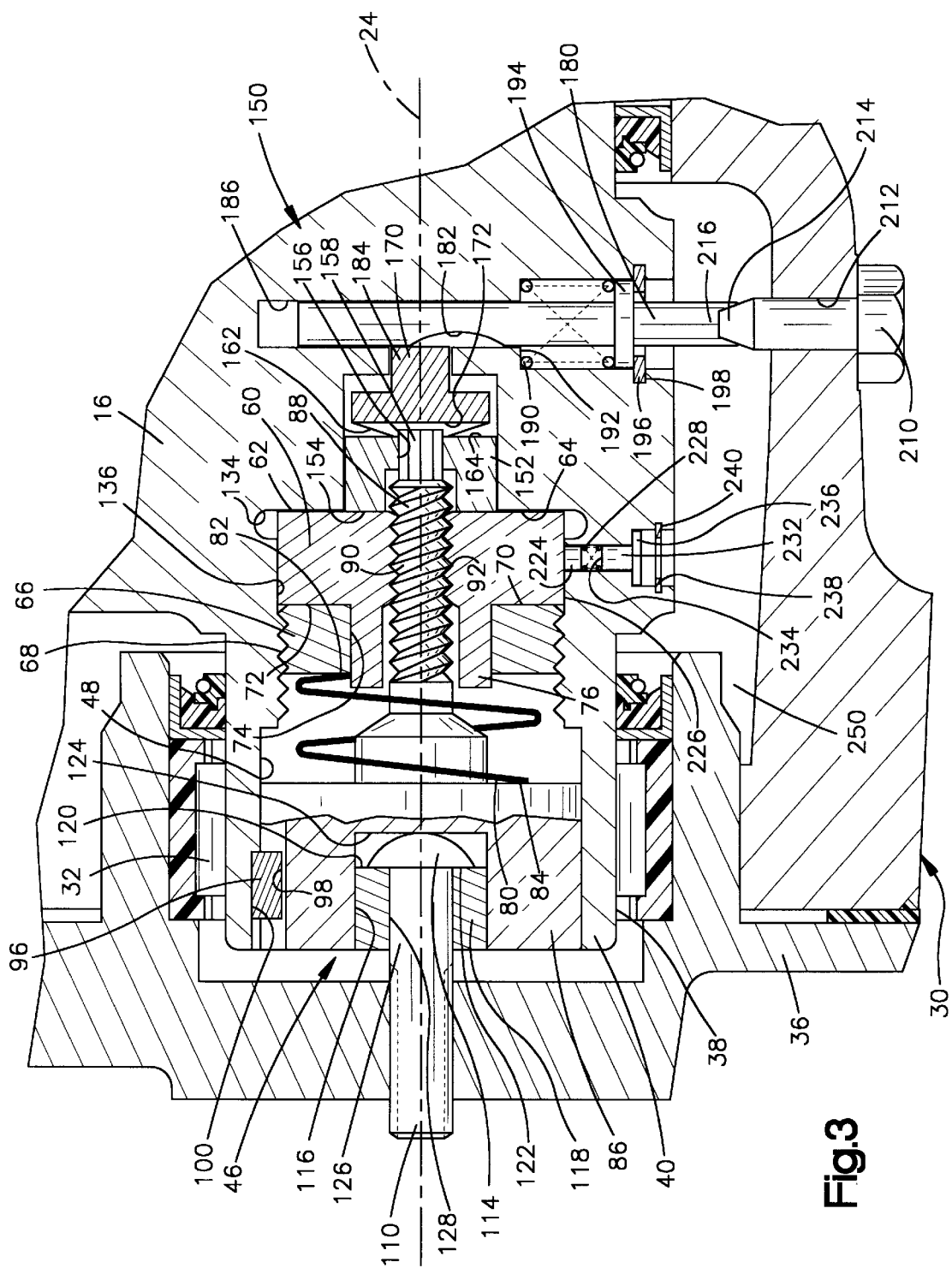
FIG. 3 is an enlarged fragmentary sectional view of the lash adjustment assembly of FIG. 2 shown in a locking position.

A plunger 180 moves the member 170 between its first position, shown in FIG. 2, and its second position, shown in FIG. 3. The plunger 180 has a recess 182 into which an end portion 184 of the member 170 extends when the member 170 is in its first position. The plunger 180 moves transversely to the axis 24 in a passage 186 in the sector gear 16.

A spring 190 urges the plunger 180 downward from a release position, as viewed in FIG. 2, toward a locking position, as seen in FIG. 3. The spring 190 extends between a shoulder 192 of the passage 186 and a flange 194 on the plunger 180. The flange 194 engages a retaining ring 196 located in a groove 198 in the sector gear 16 when the plunger 180 is in the locking position, as shown in FIG. 3.

The plunger 180 engages a bolt 210 as the sector gear 16 rotates about the axis 24 to move the plunger from the locking position shown in FIG. 3 to the release position shown in FIG. 2. The bolt 210 threadably engages an opening 212 in the housing 30 and extends into the housing 30. The bolt 210 has a tapered surface 214 engageable with an end portion 216 of the plunger 180 as the sector gear 16 rotates about the axis 24 from the position shown in FIG. 3 to the position shown in FIG. 2. When the plunger 180 engages the tapered surface 214 as the sector gear 16 rotates to the on-center position, the plunger moves to the release position.

A blocking member 224 prevents rotation of the force transmitting member 60 relative to the carrier member 86 and the sector gear 16 when the engine of the vehicle is in an operational condition. The blocking member 224 frictionally engages a radially outer surface 226 of the force transmitting member 60. A spring 228 urges the blocking member 224 toward the surface 226. A plunger 232 has an end surface 234 in engagement with the spring 228.

The plunger 232 has a release position, as shown in FIG. 2, and a blocking position, as shown in FIG. 3. A flange 236 on the plunger 232 engages a retaining ring 238 located in a groove 240 in the sector gear 16 when the plunger 232 is in the release position. When the engine is in an operating condition, a chamber 250 in the housing 30 receives high pressure fluid from the pump which urges the plunger 232 to move from the release position, shown in FIG. 2, to the blocking position shown in FIG. 3 and prevent rotation of the force transmitting member 60 relative to the sector gear 16 and the carrier member 86.

When the sector gear 16 is in a position other than the on-center position, the plunger 180 is in the locking position, as shown in FIG. 3. The spring means 162 applies a maximum force to the locking member 152. The force applied to the locking member 152 causes the splines on the locking member to engage the splines on the force transmitting member 60 with a force that prevents rotation of the force transmitting member relative to the carrier member 86 and the sector gear 16. Accordingly, adjustment of the sector gear 16 along the axis 24 is prevented.

When the engine of the vehicle is in the operating condition, the plunger 232 is in the blocking position, as shown in FIG. 3. The chamber 250 receives high pressure fluid from the pump which moves the plunger 232 to the blocking position. The spring 228 applies a maximum force to the blocking member 224. The force applied to the blocking member 224 causes the blocking member to frictionally engage the force transmitting member 60 with a force that prevents rotation of the force transmitting member relative to the sector gear 16 and the carrier member 86. Accordingly, adjustment of the sector gear 16 along the axis 24 is prevented.

When the engine of the vehicle is in the non-operational condition and the sector gear 16 is in the on-center position, as shown in FIG. 2, the force transmitting member 60 can rotate relative to the carrier member 86 and the sector gear to move the sector gear along the axis 24 and reduce clearance between the teeth on the sector gear and the rack gear. The plunger 180 is in its release position so that the spring means 162 applies a minimum force to the locking member 152. The force applied to the locking member 152 is insufficient to prevent the force transmitting member 60 from rotating relative to the carrier member 86 and the sector gear 16. The plunger 232 is in its release position so that the force applied by the spring 228 to the blocking member 224 is at a minimum. The force applied by the spring 228 is insufficient to prevent the force transmitting member 60 from rotating relative to the sector gear 16. Therefore, adjustment of the sector gear 16 along the axis 24 only occurs when the engine is in the non-operational condition and the sector gear is in the on-center position.

From the above description of the invention, those skilled in the art will perceive improvements, changes and modifications. Such improvements, changes and modifications within the skill of the art are intended to be covered by the appended claims.

What is claimed is:

1. An apparatus for use in turning steerable wheels of a vehicle having an engine, said apparatus comprising:
   a first gear which is rotatable about a first axis;
   a second gear having teeth in meshing engagement with teeth on said first gear;
   adjustment means for moving said first gear along said first axis to reduce clearance between teeth of said first and second gears; and
   a first means for preventing adjustment of said first gear along said first axis during operation of an engine of a vehicle and for enabling adjustment of said first gear along said first axis when an engine of a vehicle is in a non-operational condition.

2. An apparatus for use in turning steerable vehicle wheels, said apparatus comprising:
   a first gear;
   a second gear having teeth disposed in meshing engagement with said first gear;
   a housing at least partially enclosing said first and second gears;
   a first thread convolution which is connected with said housing and is held against axial movement relative to said housing;
   a second thread convolution which is connected with said first gear and is held against axial movement relative to said first gear, said second thread convolution being disposed in threaded engagement with said first thread convolution; and
   a spring connected with said first and second thread convolutions to effect relative rotation between said first and second thread convolutions and movement of said first gear relative to said second gear under the influence of force transmitted from said spring through said first and second thread convolutions to said first gear to reduce clearance between teeth on said first and second gears.

3. An apparatus as set forth in claim 2 wherein said first thread convolution is rotatable relative to said housing with said first gear during turning of steerable vehicle wheels.

4. An apparatus as set forth in claim 2 wherein said second thread convolution is rotatable relative to said first gear under the influence of force transmitted from said spring.

5. An apparatus as set forth in claim 4 wherein said first thread convolution is held against rotation relative to said first gear.

6. An apparatus as set forth in claim 2 wherein said first thread convolution, said second thread convolution, and said spring are rotatable relative to said housing with said first gear during turning of steerable vehicle wheels.

7. An apparatus as set forth in claim 2 further including a force transmitting member which is connected with said first gear, said force transmitting member being rotatable relative to said first gear about a first axis and being held against movement relative to said first gear along said first axis, said second thread convolution being disposed on said force transmitting member, said first and second thread convolutions have central axes which are coincident with said first axis.

8. An apparatus as set forth in claim 7 further including a carrier member which is connected with said housing, said carrier member being rotatable relative to said housing about said first axis and being held against movement along said first axis, said first thread convolution being disposed on said carrier member.

9. An apparatus as set forth in claim 8 wherein said spring has a first end portion connected with said carrier member and a second end portion connected with said force transmitting member.

10. An apparatus as set forth in claim 2 further including a carrier member which is connected with said housing, said carrier member being rotatable with said first gear relative to said housing about a first axis and being held against movement along said first axis, said first thread convolution being disposed on said carrier member, said first and second thread convolutions have central axes which are coincident with said first axis.

11. An apparatus for use in turning steerable wheels of a vehicle, said apparatus comprising:
   a first gear;
   a second gear having teeth disposed in meshing engagement with said first gear;

a housing at least partially enclosing said first and second gears;

a carrier member which is rotatable about a first axis relative to said housing, said carrier member is connected with said housing and is held against movement relative to said housing along said first axis;

a first thread convolution connected with said carrier member and having a central axis which is coincident with said first axis;

a force transmitting member which is rotatable relative to said first gear about said first axis, said force transmitting member is connected with said first gear and is movable with said first gear along said first axis;

a second thread convolution connected with said force transmitting member and having a central axis which is coincident with said first axis, said first and second thread convolutions being disposed in threaded engagement; and a spring connected with said carrier member and said force transmitting member to effect relative rotation between said carrier member and force transmitting member and movement of said force transmitting member and first gear along said first axis under the influence of force transmitted between said first and second thread convolutions.

12. An apparatus as set forth in claim 11 wherein said carrier is connected with said first gear and is held against rotation relative to said first gear.

13. An apparatus as set forth in claim 11 wherein said force transmitting member and at least a portion of said carrier member are disposed in a cavity in said first gear.

14. An apparatus for use in turning steerable wheels of a vehicle having an engine, said apparatus comprising:

a first gear which is rotatable about a first axis;

a second gear having teeth in meshing engagement with teeth on said first gear;

adjustment means for moving said first gear along said first axis to reduce clearance between teeth of said first and second gears; and a first means for preventing adjustment of said first gear along said first axis during operation of an engine of a vehicle and for enabling adjustment of said first gear along said first axis when an engine of a vehicle is in a non-operational condition, said adjustment means includes a threaded member connected to said first gear for rotation with said first gear, a force transmitting member threadably engaging said threaded member, and spring means for urging said force transmitting member to rotate relative to said threaded member to move said first gear along said first axis, said first gear being axially movable relative to said threaded member.

15. An apparatus as set forth in claim 14 wherein said first means for preventing adjustment of said first gear along said first axis during operation of a vehicle includes a blocking member engageable with said force transmitting member, means for applying a force to said blocking member to urge said blocking member toward said force transmitting member for preventing movement of said force transmitting member during operation of an engine, and means for reducing the force applied to said blocking member when an engine of a vehicle is in the non-operational condition.

16. An apparatus as set forth in claim 15 wherein said means for applying force to said blocking member includes means for supplying fluid pressure to urge said blocking member into engagement with said force transmitting member and said means for reducing the force applied to said blocking member includes means for decreasing the fluid pressure supplied by the fluid pressure supplying means.

17. An apparatus for use in turning steerable wheels of a vehicle having an engine, said apparatus comprising:

a first gear which is rotatable about a first axis;

a second gear having teeth in meshing engagement with teeth on said first gear;

adjustment means for moving said first gear along said first axis to reduce clearance between teeth of said first and second gears;

a first means for preventing adjustment of said first gear along said first axis during operation of an engine of a vehicle and for enabling adjustment of said first gear along said first axis when an engine of a vehicle is in a non-operational condition; and second means for preventing adjustment of said first gear along said first axis upon rotation of said first gear from an initial position.

18. An apparatus as set forth in claim 17 wherein said second means for preventing adjustment includes a threaded member connected to said first gear for rotation with said first gear, a force transmitting member threadably engaging said threaded member and engageable with said first gear, and spring means for urging said force transmitting member to rotate relative to said threaded member and into engagement with said first gear to move said first gear along said first axis, said first gear being axially movable relative to said threaded member.

19. An apparatus as set forth in claim 18 wherein said second means for preventing adjustment of said first gear includes a locking member engageable with said force transmitting member and said threaded member to prevent rotation of said force transmitting member relative to said threaded member.

20. An apparatus as set forth in claim 19 wherein said second means for preventing adjustment of said first gear includes means for urging said locking member toward said force transmitting member.

21. An apparatus as set forth in claim 20 further including means for reducing a force applied by said urging means to said locking member when said first gear is in the initial position.

22. An apparatus for use in turning steerable wheels of a vehicle having an engine, said apparatus comprising:

a first gear which is rotatable about a first axis;

a second gear having teeth in meshing engagement with teeth on said first gear;

adjustment means for moving said first gear along said first axis to reduce clearance between teeth of said first and second gears;

a first means for preventing adjustment of said first gear along said first axis during operation of an engine of a vehicle and for enabling adjustment of said first gear along said first axis when an engine of a vehicle is in a non-operational condition; and means for manually adjusting said first gear along said first axis to reduce clearance between teeth of said first and second gears.

23. An apparatus as set forth in claim 22 wherein said adjustment means includes a threaded member connected to said first gear for rotation with said first gear, a force transmitting member threadably engaging said threaded member, and spring means for urging said force transmitting member to rotate relative to said threaded member to move said first gear along said first axis, said first gear being axially movable relative to said threaded member.

24. An apparatus as set forth in claim 23 wherein said first means for preventing adjustment of said first gear along said first axis during operation of the vehicle includes a blocking member engageable with said force transmitting member, means for applying a force to said blocking member to urge said blocking member toward said force transmitting member for preventing movement of said force transmitting member during operation of an engine, and means for reducing the force applied to said blocking member when an engine of a vehicle is in the non-operational condition.

25. An apparatus as set forth in claim 24 wherein said means for applying force to said blocking member includes means for supplying fluid pressure to urge said blocking member into engagement with said force transmitting member and said means for reducing the force applied to said blocking member includes means for decreasing the fluid pressure supplied by the fluid pressure supplying means.

26. An apparatus as set forth in claim 22 further including second means for preventing adjustment of said first gear along said first axis upon rotation of said first gear from an initial position.

27. An apparatus as set forth in claim 26 wherein said second means for preventing adjustment includes a threaded member connected to said first gear for rotation with said first gear, a force transmitting member threadably engaging said threaded member and engageable with said first gear, and spring means for urging said force transmitting member to rotate relative to said threaded member and into engagement with said first gear to move said first gear along said first axis, said first gear being axially movable relative to said threaded member.

28. An apparatus as set forth in claim 27 wherein said second means for preventing adjustment of said first gear includes a locking member engageable with said force transmitting member and said threaded member to prevent rotation of said force transmitting member relative to said threaded member.

29. An apparatus as set forth in claim 28 wherein said second means for preventing adjustment of said first gear includes means for urging said locking member toward said force transmitting member.

30. An apparatus as set forth in claim 29 further including means for reducing the force applied by said urging means to said locking member when said first gear is in the initial position.

31. An apparatus for use in turning steerable wheels of a vehicle having an engine, said apparatus comprising:
    a first gear which is rotatable about a first axis;
    a second gear having teeth in meshing engagement with teeth on said first gear;
    a first thread convolution rotatable with said first gear;
    a member having a second thread convolution engaging said first thread convolution, said member being rotatable relative to said first thread convolution to transmit force to said first gear;
    spring means for causing relative rotation between said member and said first thread convolution to move said first gear along said first axis; and
    means for preventing said spring means from causing relative rotation between said member and said first thread convolution during operation of an engine of a vehicle and for enabling said spring means to cause relative rotation between said member and said first thread convolution when an engine of a vehicle is in a non-operational condition.

32. An apparatus as set forth in claim 31 wherein said preventing means includes a blocking member engageable with said member, means for applying a force to urge said blocking member toward said member and into engagement with said member for preventing rotation of said member relative to said first thread convolution, and means for reducing the force applied to said blocking member when an engine of a vehicle is in the non-operational condition to enable rotation of said member relative to said first thread convolution.

33. An apparatus for use in turning steerable wheels of a vehicle having an engine, said apparatus comprising:
    a first gear which is rotatable about a first axis;
    a second gear having teeth in meshing engagement with teeth on said first gear;
    a first thread convolution rotatable with said first gear;
    a member having a second thread convolution engaging said first thread convolution, said member being rotatable relative to said first thread convolution to transmit force to said first gear;
    spring means for causing relative rotation between said member and said first thread convolution to move said first gear along said first axis; and
    means for preventing said spring means from causing relative rotation between said member and said first thread convolution upon rotation of said first gear from an initial position.

34. An apparatus as set forth in claim 33 wherein said means for preventing rotation of said member relative to said first thread convolution upon rotation of said first gear from an initial position includes a locking member engageable with said member and rotatable with said first thread convolution to prevent rotation of said member relative to said first threaded convolution.

35. An apparatus as set forth in claim 34 wherein said means for preventing rotation of said member relative to said first thread convolution upon rotation of said first gear from an initial position includes means for applying a force to urge said locking member toward said member and into engagement with said member and means for reducing the force urging said locking member toward said member upon rotation of said first gear to the initial position.

36. An apparatus for use in turning steerable vehicle wheels, said apparatus comprising:
    a first gear;
    a second gear having teeth disposed in meshing engagement with said first gear;
    a housing at least partially enclosing said first and second gears;
    a first thread convolution which is connected with said housing and is held against axial movement relative to said housing;
    a second thread convolution which is connected with said first gear and is held against axial movement relative to said first gear, said second thread convolution being disposed in threaded engagement with said first thread convolution;
    a spring connected with said first and second thread convolutions to effect relative rotation between said first and second thread convolutions and movement of said first gear relative to said second gear under the influence of force transmitted from said spring through said first and second thread convolutions to said first gear to reduce clearance between teeth on said first and second gears, said second thread convolution is rotatable relative to said first gear under the influence of force transmitted from said spring; and means for retaining said second thread convolution against rotation relative to said first gear during operation of an engine of a vehicle and for enabling said second thread convolution to rotate relative to said first gear when an engine of a vehicle is in a non-operational condition.

37. An apparatus as set forth in claim 36 further including means for retaining said second thread convolution against rotation relative to said first gear upon rotation of said first gear from an initial position relative to said housing.

38. An apparatus for use in turning steerable vehicle wheels, said apparatus comprising:

a first gear;

a second gear having teeth disposed in meshing engagement with said first gear;

a housing at least partially enclosing said first and second gears;

a first thread convolution which is connected with said housing and is held against axial movement relative to said housing;

a second thread convolution which is connected with said first gear and is held against axial movement relative to said first gear, said second thread convolution being disposed in threaded engagement with said first thread convolution;

a spring connected with said first and second thread convolutions to effect relative rotation between said first and second thread convolutions and movement of said first gear relative to said second gear under the influence of force transmitted from said spring through said first and second thread convolutions to said first gear to reduce clearance between teeth on said first and second gears, said second thread convolution is rotatable relative to aid first gear under the influence of force transmitted from said spring; and means for retaining said second thread convolution against rotation relative to said first gear upon rotation of said first gear from an initial position relative to said housing.

39. An apparatus for use in turning steerable vehicle wheels, said apparatus comprising:

a first gear;

a second gear having teeth disposed in meshing engagement with said first gear;

a housing at least partially enclosing said first and second gears;

a first thread convolution which is connected with said housing and is held against axial movement relative to said housing;

a second thread convolution which is connected with said first gear and is held against axial movement relative to said first gear, said second thread convolution being disposed in threaded engagement with said first thread convolution; and a spring connected with said first and second thread convolutions to effect relative rotation between said first and second thread convolutions and movement of said first gear relative to said second gear under the influence of force transmitted from said spring through said first and second thread convolutions to said first gear to reduce clearance between teeth on said first and second gears, said first gear includes surface means for at least partially defining a cavity in said first gear, said first thread convolution, said second thread convolution, and said spring are disposed in said cavity in said first gear.

40. An apparatus as set forth in claim 39 wherein said first thread convolution, said second thread convolution, and said spring are rotatable relative to said housing with said first gear during turning of steerable vehicle wheels.

41. An apparatus as set forth in claim 39 further including a force transmitting member which is connected with said first gear, said force transmitting member being rotatable relative to said first gear about a first axis and being held against movement along said first axis, said second thread convolution being disposed on said force transmitting member, said first and second thread convolutions have central axes which are coincident with said first axis.

42. An apparatus as set forth in claim 41 further including a carrier member which is connected with said housing, said carrier member being rotatable relative to said housing about said first axis and being held against movement along said first axis, said first thread convolution being disposed on said carrier member.

43. An apparatus as set forth in claim 42 wherein said spring has a first end portion connected with said carrier member and a second end portion connected with said force transmitting member.

44. An apparatus as set forth in claim 39 further including a carrier member which is connected with said housing, said carrier member being rotatable with said first gear relative to said housing about a first axis and being held against movement along said first axis, said first thread convolution being disposed on said carrier member, said first and second thread convolutions have central axes which are coincident with said first axis.

45. An apparatus for use in turning steerable wheels of a vehicle, said apparatus comprising:

a first gear;

a second gear having teeth disposed in meshing engagement with said first gear;

a housing at least partially enclosing said first and second gears;

a carrier member which is rotatable about a first axis relative to said housing, said carrier member is connected with said housing and is held against movement relative to said housing along said first axis;

a first thread convolution connected with said carrier member and having a central axis which is coincident with said first axis;

a force transmitting member which is rotatable relative to said first gear about said first axis, said force transmitting member is connected with said first gear and is movable with said first gear along said first axis;

a second thread convolution connected with said force transmitting member and having a central axis which is coincident with said first axis, said first and second thread convolutions being disposed in threaded engagement;

a spring connected with said carrier member and said force transmitting member to effect relative rotation between said carrier member and force transmitting member and movement of said force transmitting member and first gear along said first axis under the influence of force transmitted between said first and second thread convolutions; and a retainer member which is operable between a first condition and a second condition, said retainer member being effective to retain one of said carrier and force transmitting members against rotation about said first axis when said retainer member is in the first condition, said retainer member being ineffective to retain said one of said carrier and force transmitting members against rotation about said first axis when said retainer member is in the second condition.

46. An apparatus as set forth in claim 45 wherein said retainer member is in the second condition when said first gear is in an initial position relative to said housing, said retainer member is in the first condition when said first gear has moved to a position offset from the initial position.

47. An apparatus as set forth in claim 45 wherein said retainer member is in the first condition during operation of an engine of a vehicle and is in the second condition when an engine of a vehicle is in a non-operational condition.

48. An apparatus as set forth in claim 45 wherein said carrier is connected with said first gear and is held against rotation relative to said first gear.

49. An apparatus as set forth in claim 45 wherein said force transmitting member and at least a portion of said carrier member are disposed in a cavity in said first gear.

50. An apparatus comprising:
a vehicle, said vehicle having an engine and steerable wheels;
a first gear which is rotatable about a first axis and is connected with said steerable wheels of said vehicle;
a second gear having teeth in meshing engagement with teeth on said first gear;
adjustment means connected with said first gear for moving said first gear along said first axis to reduce clearance between teeth of said first and second gears; and
a first means connected with said adjustment means for preventing adjustment of said first gear along said first axis during operation of said engine of said vehicle and for enabling adjustment of said first gear along said first axis when said engine of said vehicle is in a non-operational condition.

51. An apparatus as set forth in claim 50 wherein said adjustment means includes a threaded member connected to said first gear for rotation with said first gear, a force transmitting member threadably engaging said threaded member, and spring means for urging said force transmitting member to rotate relative to said threaded member to move said first gear along said first axis, said first gear being axially movable relative to said threaded member.

52. An apparatus as set forth in claim 51 wherein said first means for preventing adjustment of said first gear along said first axis during operation of said vehicle includes a blocking member engageable with said force transmitting member, means for applying a force to said blocking member to urge said blocking member toward said force transmitting member for preventing movement of said force transmitting member during operation of said engine.

53. An apparatus as set forth in claim 52 wherein said means for applying force to said blocking member includes means for supplying fluid pressure to urge said blocking member into engagement with said force transmitting member.

54. An apparatus as set forth in claim 50 further including second means for preventing adjustment of said first gear along said first axis upon rotation of said first gear from an initial position.

55. An apparatus as set forth in claim 54 wherein said second means for preventing adjustment includes a threaded member connected to said first gear for rotation with said first gear, a force transmitting member threadably engaging said threaded member and engageable with said first gear, and spring means for urging said force transmitting member to rotate relative to said threaded member and into engagement with said first gear to move said first gear along said first axis, said first gear being axially movable relative to said threaded member.

56. An apparatus as set forth in claim 55 wherein said second means for preventing adjustment of said first gear includes a locking member engageable with said force transmitting member and said threaded member to prevent rotation of said force transmitting member relative to said threaded member.

57. An apparatus as set forth in claim 56 wherein said second means for preventing adjustment of said first gear includes means for urging said locking member toward said force transmitting member.

58. An apparatus as set forth in claim 57 further including means for reducing the force applied by said urging means to said locking member when said first gear is in the initial position.

59. An apparatus as set forth in claim 50 further including means for manually adjusting said first gear along said first axis to reduce clearance between teeth of said first and second gears.

60. An apparatus for use in turning steerable vehicle wheels, said apparatus comprising:
a first gear;
a second gear having teeth disposed in meshing engagement with said first gear;
a housing at least partially enclosing said first and second gears, said first and second gears being rotatable relative to said housing;
a first thread convolution which is connected with said first gear and is held against rotation relative to said first gear, said first thread convolution being connected with said housing and held against axial movement relative to said housing;
a second thread convolution which is connected with said first gear and is held against axial movement relative to said first gear, said second thread convolution being rotatable relative to said first gear and being disposed in threaded engagement with said first thread convolution; and
a spring connected with said first and second thread convolutions to effect rotation of said second thread convolution relative to said first thread convolution and movement of said first gear relative to said second gear under the influence of force transmitted from said spring through said first and second thread convolutions to said first gear to reduce clearance between teeth on said first and second gears.

61. An apparatus as set forth in claim 60 further including means for retaining said second thread convolution against rotation relative to said first gear during operation of an engine of a vehicle and for enabling said second thread convolution to rotate relative to said first gear when an engine of a vehicle is in a non-operational condition.

62. An apparatus as set forth in claim 60 further including means for retaining said second thread convolution against rotation relative to said first gear upon rotation of said first gear from an initial position relative to said housing.

63. An apparatus as set forth in claim 60 wherein said first gear includes surface means for at least partially defining a cavity in said first gear, said first thread convolution, said second thread convolution, and said spring are disposed in said cavity in said first gear.

64. An apparatus as set forth in claim 60 wherein said first thread convolution, said second thread convolution, and said spring are rotatable relative to said housing with said first gear during turning of steerable vehicle wheels.

65. An apparatus for use in turning steerable vehicle wheels of a vehicle, said apparatus comprising:

a first gear which is rotatable from a straight-ahead position to a turning position during turning movement of steerable vehicle wheels;

a second gear having teeth disposed in meshing engagement with teeth on said first gear;

a housing at least partially enclosing said first and second gears;

a first member on which a first thread convolution is disposed, said first member being connected with said housing;

a second member on which a second thread convolution is disposed, said second thread convolution being disposed in engagement with said first thread convolution, said first and second members being mounted for relative rotation;

a lock member which engages at least one of said first and second members to prevent relative rotation between said first and second members when said first gear is in a turning position, said lock member being ineffective to prevent relative rotation between said first and second members when said first gear is in the straight-ahead position; and a spring connected with said first and second members, said spring being effective to induce rotation of one of said first and second members relative to another of said first and second members when said first gear is in the straight-ahead position to move said first gear relative to said second gear to reduce clearance between teeth on said first and second gears, said spring being ineffective to induce rotation of said one of said first and second members relative to the other of said first and second members when said first gear is in a turning position.

66. An apparatus as set forth in claim 65 wherein said first gear includes a surface which at least partially defines a cavity in said first gear, said first and second members and said spring being at least partially disposed in said cavity.

67. An apparatus as set forth in claim 66 wherein said first member has a first end portion which is connected with said housing and a second end portion which is disposed in said cavity in said first gear, said first thread convolution being disposed on said second end portion of said first member, said second member being disposed in said cavity in said first gear and being rotatable relative to said first gear under the influence of force transmitted from said spring to said second member, said spring having a first end portion which is disposed in said cavity in the first gear and is connected with said first member and a second end portion which is disposed in said cavity in the first gear and is connected with said second member.

68. An apparatus as set forth in claim 67 wherein said lock member is disposed in said cavity in the first gear, said lock member being disposed in engagement with said second member when said first gear is in a turning position.

69. An apparatus comprising:

a vehicle, said vehicle having an engine and steerable wheels, the engine of said vehicle having a non-operational condition and an operating condition;

a first gear which is connected with the steerable wheels of said vehicle, said first gear being rotatable from an initial position in which the steerable wheels of said vehicle are in a straight-ahead orientation to a position in which the steerable wheels of said vehicle are in a turning orientation;

a second gear having teeth disposed in meshing engagement with teeth on said first gear;

a housing at least partially enclosing said first and second gears;

a first member on which a first thread convolution is disposed, said first member being connected with said housing;

a second member on which a second thread convolution is disposed, said second thread convolution being disposed in engagement with said first thread convolution, said first and second members being mounted for relative rotation;

a lock member which engages at least one of said first and second members to prevent relative rotation between said first and second members during operation of the engine of said vehicle, said lock member being ineffective to prevent relative rotation between said first and second members when the engine of said vehicle is in the non-operational condition; and a spring connected with said first and second members, said spring being effective to induce rotation of one of said first and second members relative to another of said first and second members when the engine of said vehicle is in the non-operational condition, said spring being ineffective to induce rotation of said one of said first and second members relative to the other of said first and second members during operation of the engine of said vehicle.

70. An apparatus as set forth in claim 69 further including a cavity formed in said first gear which is exposed to fluid pressure during operation of the engine, said lock member being urged toward said one of said first and second members under the influence of fluid pressure in said cavity during operation of the engine of said vehicle.

71. An apparatus as set forth in claim 69 further including a second lock member which engages at least one of said first and second members to prevent relative rotation between said first and second members when the first gear is in a position in which the steerable wheels of said vehicle are in a turning orientation, said second lock member being in effective to prevent relative rotation between said first and second members when the first gear is in a position in which the steerable wheels of said vehicle are in a straight-ahead orientation.

72. An apparatus as set forth in claim 69 wherein said first gear includes a surface which at least partially defines a cavity in said first gear, said first and second members and said spring being at least partially disposed in said cavity.

73. An apparatus as set forth in claim 72 wherein said first member has a first end portion which is connected with said housing and a second end portion which is disposed in said cavity in said first gear, said first thread convolution being disposed on said second end portion of said first member, said second member being disposed in said cavity in said first gear and being rotatable relative to said first gear under the influence of force transmitted from said spring to said second member, said spring having a first end portion which is disposed in said cavity in the first gear and is connected with said first member and a second end portion which is disposed in said cavity in the first gear and is connected with said second member.

74. An apparatus comprising:

a vehicle, said vehicle having steerable wheels which are movable relative to said vehicle between a straight-ahead condition;

a first gear which is rotatable about a first axis;

a second gear having teeth in meshing engagement with teeth on said first gear, said first and second gears being connected with said steerable wheels of said vehicle;

adjustment means connected with said first gear for moving said first gear along said first axis to reduce clearance between teeth of said first and second gears, said adjustment means includes a threaded member connected to said first gear for rotation with said first gear, a force transmitting member threadably engaging said threaded member, and spring means for urging said force transmitting member to rotate relative to said threaded member to move said first gear along said first axis, said first gear being axially movable relative to said threaded member; and a first means connected with said adjustment means for enabling adjusment of said first gear along said first axis when said steerable wheels of said vehicle are in the straigt-ahead condition and for preventing adjustment of said first gear along said first axis when said steerable wheels of said vehicle are in the second condition offset from said straight-ahead condition.

75. An apparatus as set forth in claim 74 wherein said first means for enabling adjustment of said first gear along said first axis when said steerable wheels of said vehicle are in the straight-ahead condition includes a locking member engageable with said force transmitting member, means for applying a force to said locking member to urge said locking member toward said force transmitting member for preventing movement of said force transmitting member when said steerable vehicle wheels are in the second condition, and means for reducing the force applied to said locking member when said steerable vehicle wheels are in said straight-ahead condition.

76. An apparatus for use in turning steerable wheels of a vehicle, said apparatus comprising:

a first gear which is rotatable about a first axis between an initial position and a plurality of positions offset from said initial position;

a second gear having teeth in meshing engagement with teeth on said first gear;

adjustment means connected with said first gear for moving said first gear along said first axis to reduce clearance between teeth of said first and second gears, said adjustment means includes a threaded member connected to said first gear for rotation with said first gear, a force transmitting member threadably engaging said threaded member, and spring means for urging said force transmitting member to rotate relative to said threaded member to move said first gear along said first axis, said first gear being axially movable relative to said threaded member; and a first means connected with said adjustment means for preventing adjustment of said first gear along said first axis upon rotation of said first gear from said initial position and for enabling adjustment of said first gear along said first axis when said first gear is in said initial position.

77. An apparatus as set forth in claim 76 wherein said first means for preventing adjustment of said first gear along said first axis upon rotation of said first gear from said initial position includes a locking member engageable with said force transmitting member, means for applying a force to said locking member to urge said locking member toward said force transmitting member for preventing movement of said force transmitting member upon rotation of said first gear from said initial position, and means for reducing the force applied to said locking member when said first gear is im the initial position.

* * * * *